(12) United States Patent
Zietz et al.

(10) Patent No.: US 10,605,979 B2
(45) Date of Patent: Mar. 31, 2020

(54) LATITUDINAL COLOR GRADIENT LIGHT GUIDE

(71) Applicant: Continental Automotive Systems, Inc., Auburn Hills, MI (US)

(72) Inventors: Heath D. Zietz, Ortonville, MI (US); Vyacheslav Birman, Auburn Hills, MI (US); Curt Ollila, Fenton, MI (US)

(73) Assignee: Continental Automotiove Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/406,218

(22) Filed: May 8, 2019

(65) Prior Publication Data

US 2019/0346617 A1 Nov. 14, 2019

Related U.S. Application Data

(60) Provisional application No. 62/669,776, filed on May 10, 2018.

(51) Int. Cl.
*F21V 8/00* (2006.01)
*F21S 43/249* (2018.01)
*F21S 43/239* (2018.01)
*F21S 43/245* (2018.01)

(52) U.S. Cl.
CPC .......... *G02B 6/0068* (2013.01); *F21S 43/239* (2018.01); *F21S 43/245* (2018.01); *F21S 43/249* (2018.01); *G02B 6/0058* (2013.01)

(58) Field of Classification Search
CPC ............ F21S 43/235–251; F21S 41/24; G02B 6/00–0096; G02B 19/00–0095
See application file for complete search history.

(56) References Cited

U.S. PATENT DOCUMENTS

| 7,618,171 | B2 * | 11/2009 | Tessnow | F21S 48/1154 362/511 |
| 2005/0152141 | A1 * | 7/2005 | Suzuki | B60Q 1/0052 362/241 |
| 2006/0234612 | A1 * | 10/2006 | Gotthardt | B60Q 1/0683 452/58 |
| 2016/0341392 | A1 * | 11/2016 | Zelikovskaya | F21S 43/20 |
| 2019/0285242 | A1 * | 9/2019 | Horikawa | F21S 43/237 |

* cited by examiner

*Primary Examiner* — Mariceli Santiago

(57) ABSTRACT

A latitudinal color gradient light guide emits colored light having a color gradient that changes continuously from a base of the light guide to a top or apex of the guide.

7 Claims, 6 Drawing Sheets

LATITUDINAL COLOR GRADIENT LIGHT GUIDE

BACKGROUND

Prior art dashboard lighting devices provide only solid colors in the latitudinal, i.e., vertical direction. An apparatus that provides a color gradient in a latitudinal as well as an angular direction would be an improvement over the prior art.

DETAILED DESCRIPTION

As used herein, the term, light-transmissive material refers to a solid material, i.e., non-gaseous and non-liquid material, which transmits light. Glass and plastics are two examples of light-transmissive materials.

Figure 1:
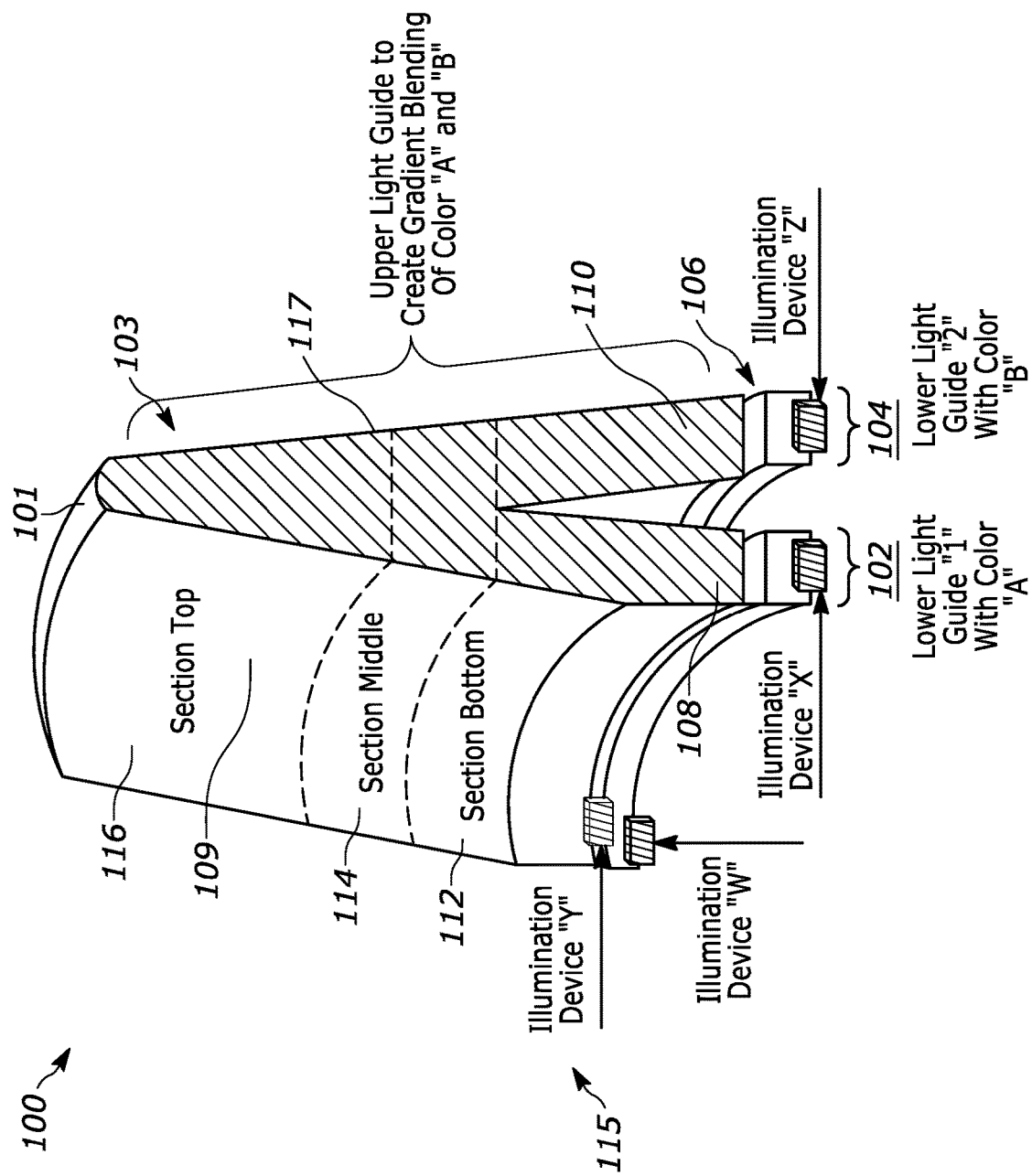
FIG. 1 depicts a substantially V-shaped block of light transmissive material and two differently-colored light sources, positioned to transmit a colored, non-white light into corresponding first and second legs of the V-shaped block.
Figure 2:
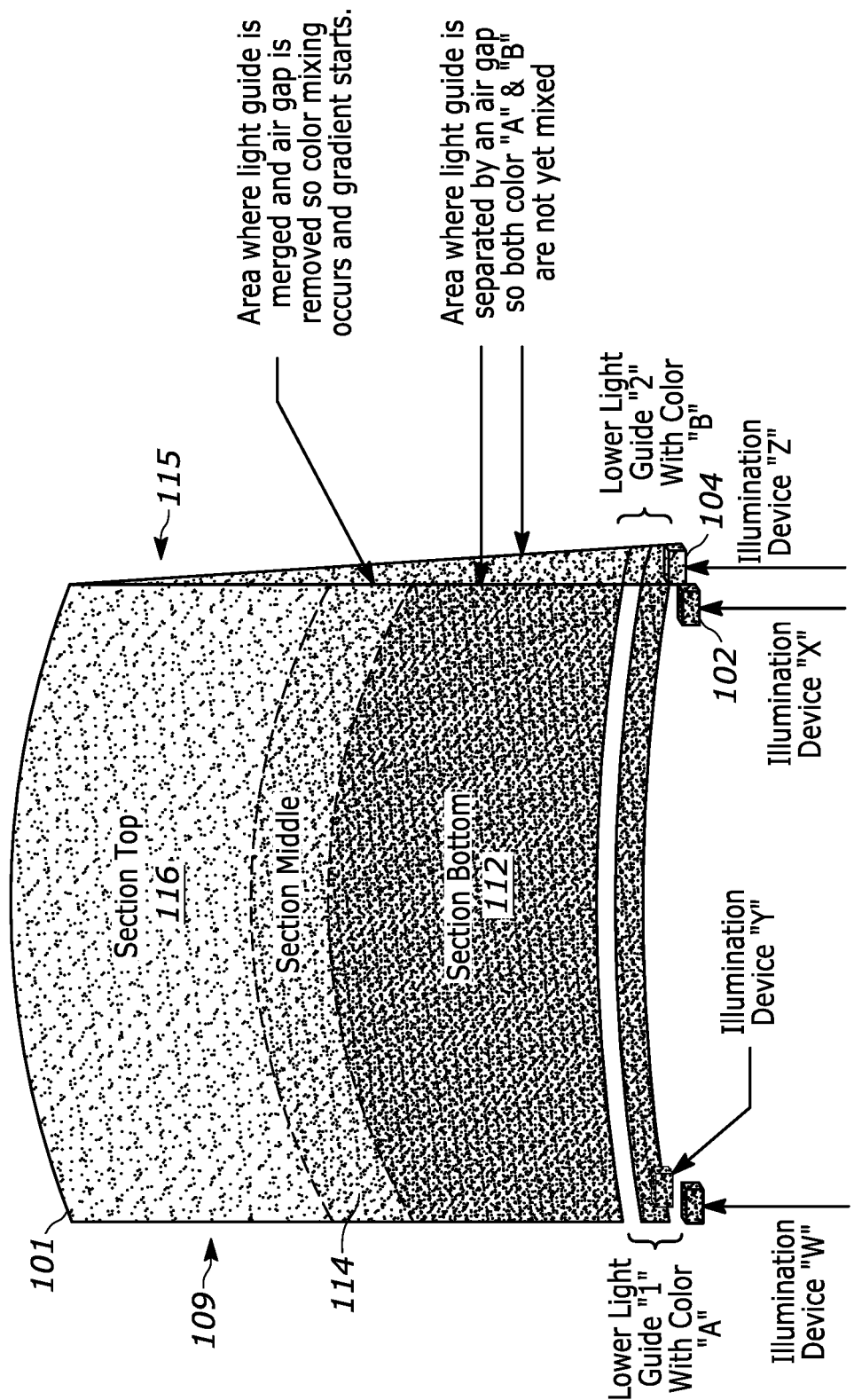
FIG. 2 depicts three regions of a planar surface of one leg of the V-shaped block.

FIG. 1 depicts a latitudinal color gradient light guide 100 embodied as a substantially V-shaped block 103 of light-transmissive material and two discrete and differently-colored light sources 102, 104 positioned below the bottom 106 of a first leg 108 of the block 103 and a second leg 110 of the same block 103. The light sources 102, 104 are "optically coupled" to the corresponding bottoms of the legs 108, 110 through an air gap.

In the embodiment of FIG. 1, the substantially V-shaped block of light transmissive material comprises a right prism portion 109 having opposing ends 119 and by which the right prism 103 is considered herein as being bounded by the ends 119. Two lateral faces 115, 117 of the right prism portion 109 are substantially orthogonal to the ends 119. The legs 108 and 110 extend downwardly from the bottom of the right prism portion 109 diverge away from each other and are at an acute angle (i.e., an angle less than ninety degrees) relative to each other and measured from the apex 101 of the right prism portion 109. The light sources 102, 104, preferably embodied as light emitting diodes (LEDs), emit non-white light, i.e., colored light, through the air gap between the light source and legs, into the bottom 106 of each corresponding leg 108, 110 of the substantially V-shaped block 103.

The substantially V-shaped block 103 depicted in FIG. 1 is considered herein as having a planar or substantially planar "first face" 115, which in FIG. 1 is the left-hand side of the substantially V-shaped block 103. The first face 115 is considered herein as having three regions or portions identified with reference numerals 112, 114 and 116. The first or lowest region is identified by reference numeral 112. A middle region is identified generally by reference numeral 114 and is a portion of the V-shaped block located "above" where the two legs 102 and 104 merge at an imaginary vertex in the middle region 114 to form a substantially wedge-shaped "top portion" of the block 103. (The precise location of the vertex per se is not germane to the invention disclosed and claimed herein.) A top or upper portion or region is identified generally by reference numeral 116.

Since the block 103 is made of light-transmissive material, colored light that enters the bottom 106 of the first leg 108 travels upwardly (as shown in the figure) through the first leg 106 toward the apex 101 of the block 103. Light from only the first source 102 is thus emitted out of a first and lower portion 112 of one side of block 103. In a second or middle portion 114 of the block 103, light from the second source 104 is blended in the block 103 with light from the first source 102. The blended light, i.e., light that is a blend or combination of both light sources, is emitted from the surface of the middle portion 114 as a continuously-changing blend of the colors emitted from the first and second light sources 102, 104, i.e., a color gradient. The color gradient changes continuously between the color emitted from the first source 102 to the color emitted from the second source. The color emitted from the top portion 116 is only the color emitted from the second light source 104. The colors emitted from the middle portion 102 change continuously and thus replicate the continuously-changing light colors commonly seen at sunrise simply by selecting colors emitted by the two light sources 102, 104.

Those of ordinary skill in the art should recognize that in order for the structures shown in the figures to work, i.e., to blend different colors progressively, the bottoms or bases of the legs 108, 110 need to be spatially separated from each other so that they absorb light from essentially only one light source. In order to maximize light absorption, the light sources should be held as close as possible to, i.e., "proximate," the bottom or base of the legs 108, 110. In one embodiment, the exterior upper surface 120 of either one or both of the light sources 102/194 is roughened to increase absorption and dispersion of emitted light. Surface roughening can be accomplished a number of ways, examples of which including abrasion, cutting grooves or knurling. Such a surface is considered herein to be one that is either roughened or "not smooth."

Figure 5:
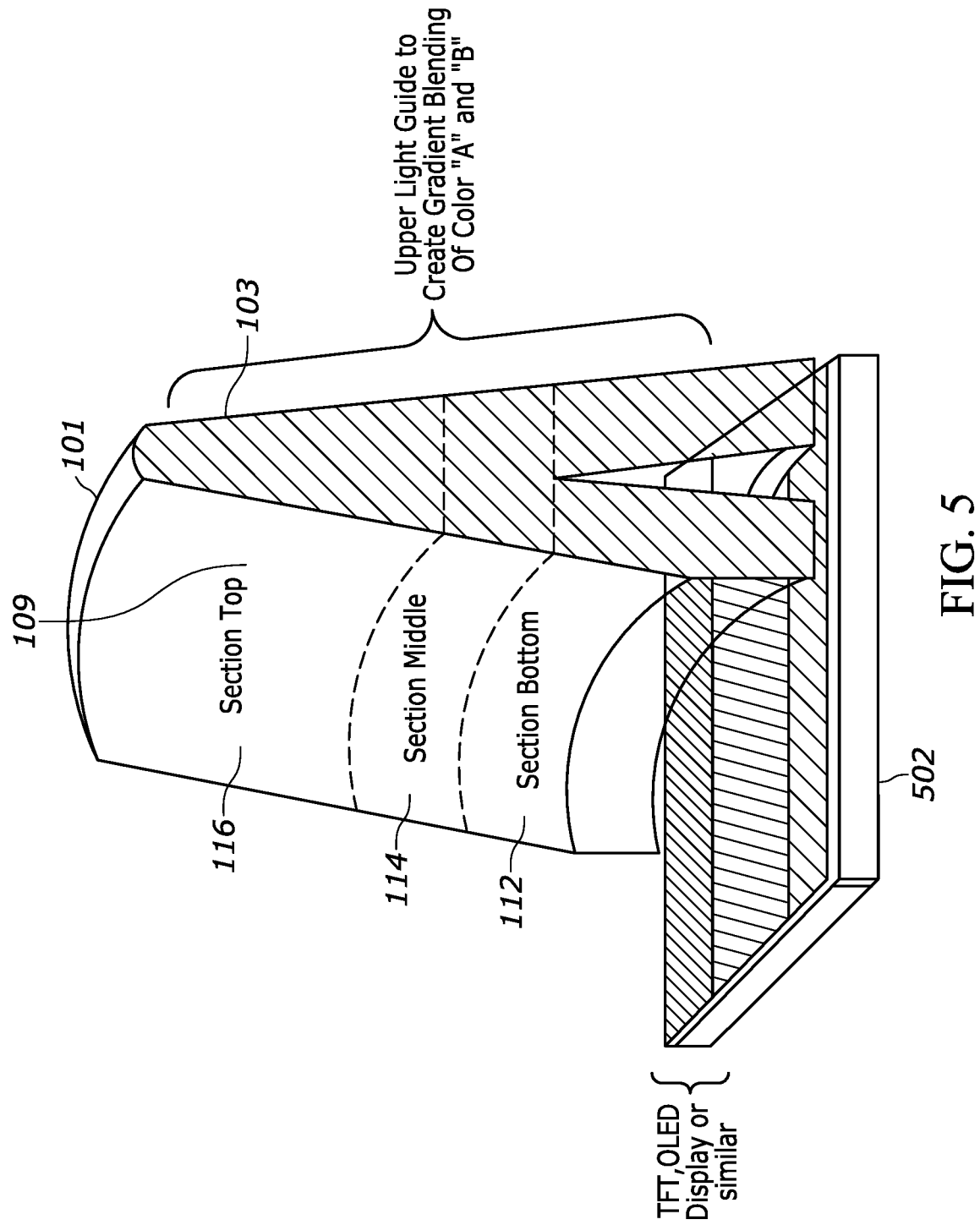
FIG. 5 depicts a single, flat panel color display device that effectively provides different-color light into the legs of the substantially V-shaped block of light transmissive material.

In another embodiment, depicted in FIG. 5, the two discrete light sources 102, 104 depicted in FIG. 1 are replaced with a color display panel 502 or equivalent, separate or discrete areas of which can be controlled to emit different color lights. In such an embodiment, different areas or regions of a display device that emit different-color lights are considered herein to be first and second light sources, even though they are emitted from the same physical device.

Figure 3:
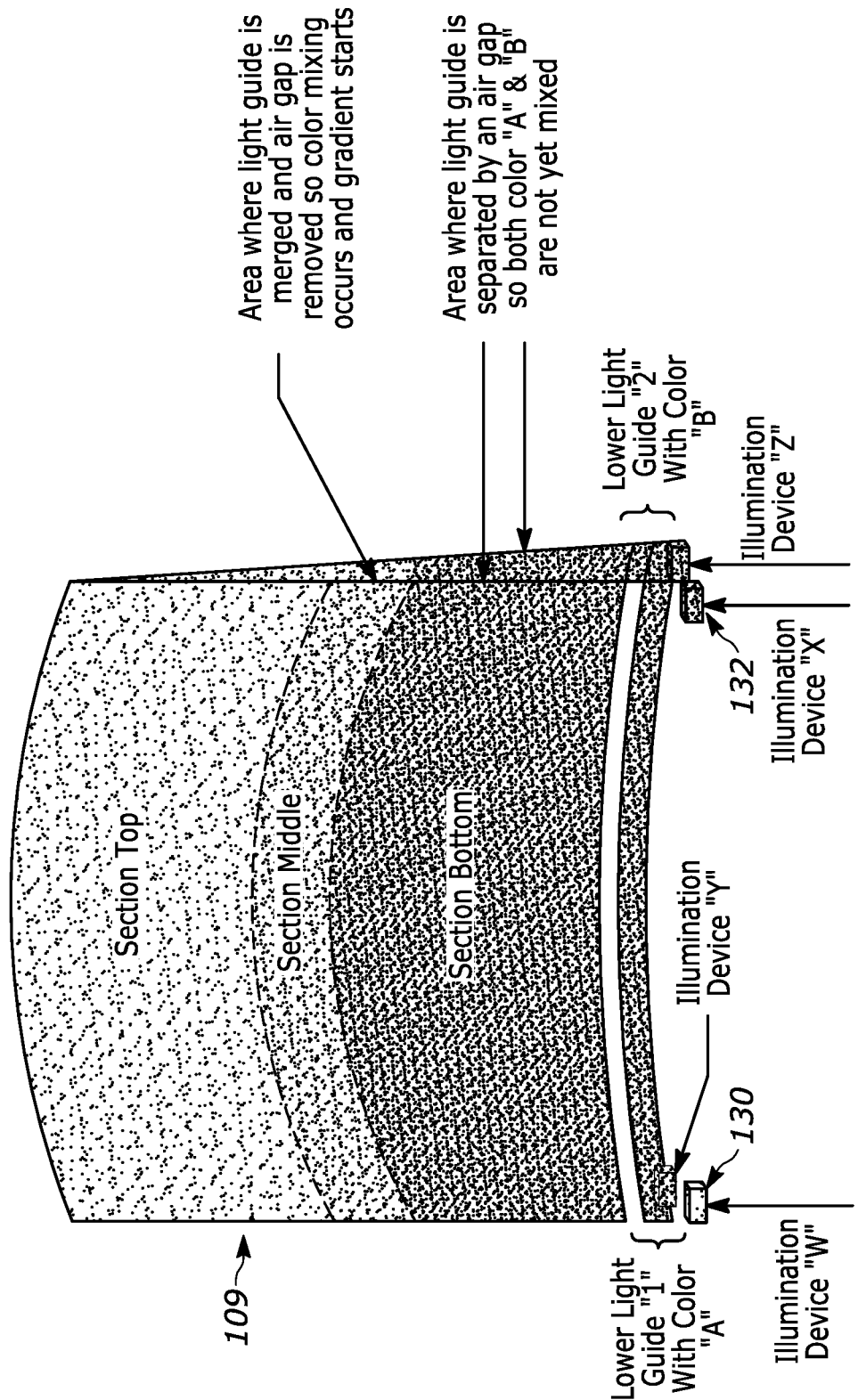
FIG. 3 depicts different color lights at opposing ends of the V-shaped block.
Figure 4:
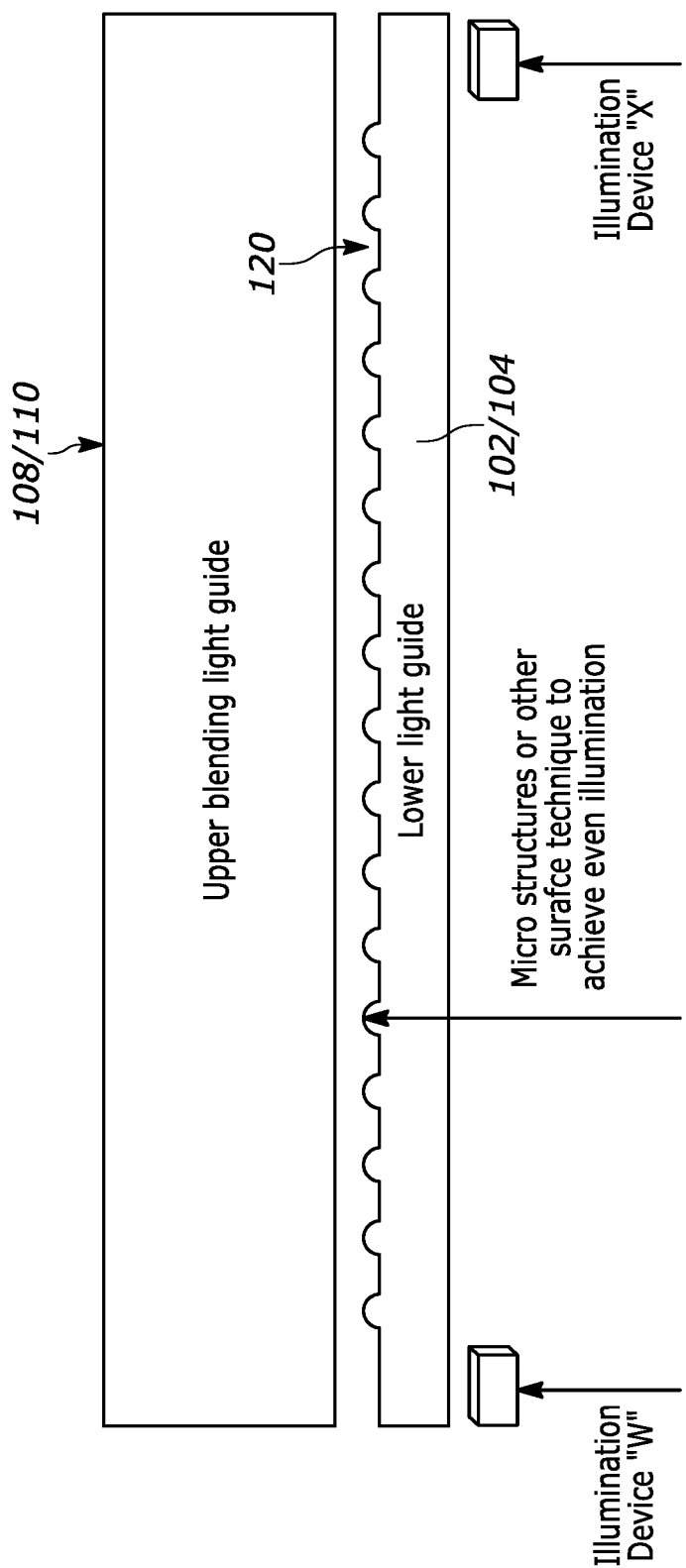
FIG. 4 depicts a non-smooth surface of a light source that provides improved light transmission into the legs of the substantially V-shaped block of light transmissive material.

In yet another embodiment shown in FIG. 3, left and right ends 130, 132 of the bottoms of the legs 108, 110 are provided with different color light sources. The differently-colored light from the left and right ends 130, 132 blends inside the block and is emitted as a left-to-right or right-to-left, continuously-changing color gradient.

Figure 6B:
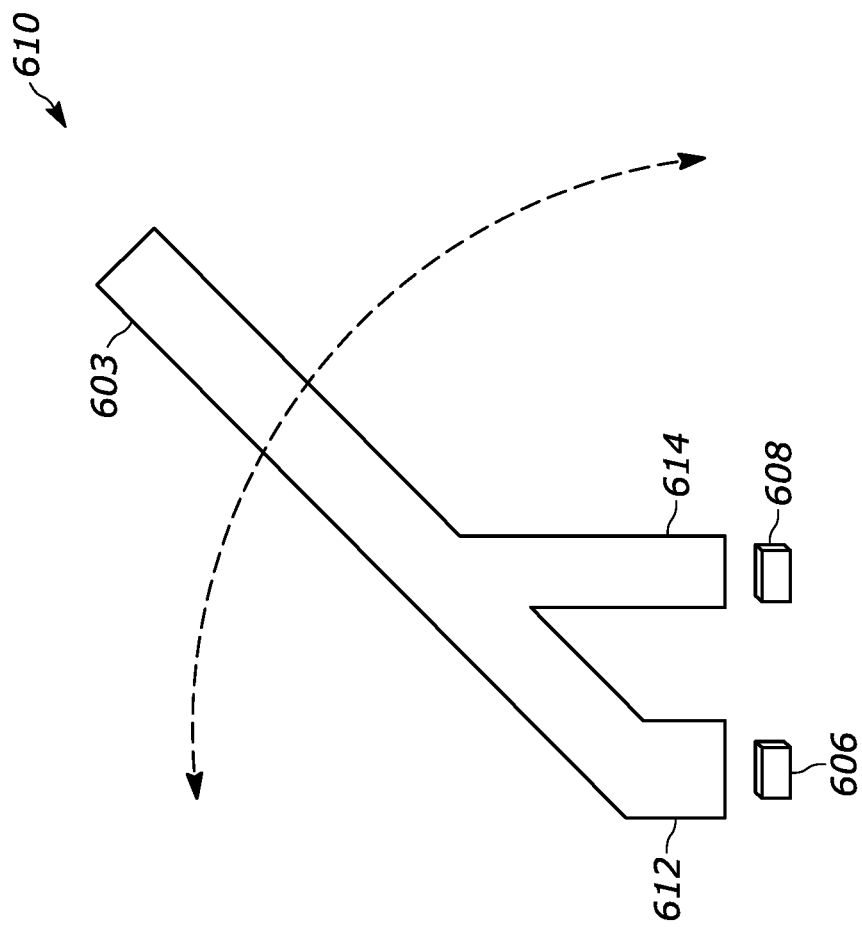
FIGS. 6A and 6B depict alternate embodiments of light-transmissive blocks, which are oriented to light-absorbing angles at different angles.
Figure 6A:
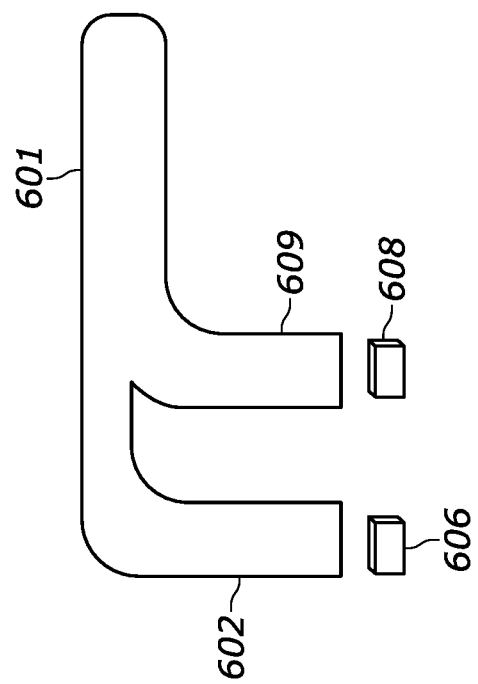

FIGS. 6A and 6B show two alternate embodiments of a latitudinal color gradient light guide 600 and 610.

In FIG. 6A, the first alternate embodiment 600 comprises a substantially-horizontal (as shown) block of light-transmissive material 601 formed with two, light-transmissive legs 602, 604. The legs 602, 604 are "coupled to" different-color light sources 606, 608 by an air gap between them. The legs 602, 605 are substantially orthogonal to the substantially horizontal block.

In FIG. 6B, a block of light-transmissive material 603 is inclined at an angle relative to two, substantially-vertical light-transmissive legs 612, 614. As with the other embodiments, the light sources 606, 608 are coupled to the legs 612, 614 through an air gap.

The foregoing description is for purposes of illustration. The true scope of the invention is defined by the claims.

What is claimed is:

1. A latitudinal color gradient light guide comprising:
a substantially V-shaped block of light transmissive material, the substantially V-shaped block comprising first and second legs of light transmissive material at an acute angle and which meet at a vertex of the substantially V-shaped block, the first leg having a substantially planar first face, which is configured to emit colored light, the emitted color light having a color gradient that changes continuously from a base of the first leg to the apex;
a first light source proximate a base of the first leg and configured to transmit a first, non-white colored light into the base of the first leg;
a second light source proximate a base of the second leg and configured to transmit a second and different non-white colored light into the base of the second leg;
wherein, the first non-white colored light is emitted from a first, lower portion of the substantially planar first face of the first leg, wherein a mixture of the first and second non-white colored lights is emitted from a second portion of the substantially planar face of the first leg, the second portion being located above the first portion and wherein the second non-white colored light is emitted from a third portion of the substantially planar face of the first leg, the third portion being located above the second portion.

2. The latitudinal color gradient light guide of claim 1, wherein only the first non-white colored light is emitted from the first, lower portion of the substantially planar first faces of the first leg, wherein a mixture of the first and second non-white colored lights is emitted from the second portion of the substantially planar face of the first leg, the second portion being located above the first portion and wherein only the second non-white colored light is emitted from the third portion of the substantially planar face of the first leg, the third portion being located above the second portion.

3. The latitudinal color gradient light guide of claim 1, wherein at least one of the first and second light sources has a light-emitting surface that faces the base of a corresponding leg but which is spatially separated from the base of said corresponding leg.

4. The latitudinal color gradient light guide of claim 2, wherein the light-emitting surface is not smooth.

5. The latitudinal color gradient light guide of claim 1, wherein the first and second light sources comprise a single flat panel display device having a first region that provides a first color light into the base of the first leg and having a second region that provides a second color into the base of the second leg.

6. The latitudinal color gradient light guide of claim 1, wherein the substantially V-shaped block of light transmissive material comprises a right prism bounded by two polygonal and substantially parallel bases and at least two lateral faces, which are substantially orthogonal to the bases.

7. The latitudinal color gradient light guide of claim 1, wherein a first colored light source provides a first color light into a first polygonal base and wherein a second colored light source provides a second color light into the second polygonal base, such that visible light emitted from at least one of the lateral faces has a color gradient that changes continuously between the bases.

* * * * *